(12) United States Patent
An et al.

(10) Patent No.: US 9,813,619 B2
(45) Date of Patent: Nov. 7, 2017

(54) APPARATUS AND METHOD FOR CORRECTING IMAGE DISTORTION OF A CAMERA FOR VEHICLE

(71) Applicant: Hyundai Motor Company, Seoul (KR)

(72) Inventors: Jun Sik An, Gyeonggi-do (KR); Joong Ryoul Lee, Incheon (KR); Kap Je Sung, Gyeonggi-do (KR); Eu Gene Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 14/564,751

(22) Filed: Dec. 9, 2014

(65) Prior Publication Data
US 2016/0027158 A1    Jan. 28, 2016

(30) Foreign Application Priority Data

Jul. 24, 2014    (KR) ........................ 10-2014-0094138

(51) Int. Cl.
*H04N 5/232*    (2006.01)
*G06T 7/80*    (2017.01)

(52) U.S. Cl.
CPC ........... *H04N 5/23238* (2013.01); *G06T 7/80* (2017.01); *G06T 2207/30252* (2013.01)

(58) Field of Classification Search
CPC ........ G06T 2207/30252; G06T 7/0018; H04N 5/23238

(Continued)

(56) References Cited

U.S. PATENT DOCUMENTS

| 9,535,423 | B1* | 1/2017 | Debreczeni | .......... G05D 1/0246 |
| 2005/0163343 | A1* | 7/2005 | Kakinami | .......... G06K 9/00812 |
| | | | | 382/103 |

(Continued)

FOREIGN PATENT DOCUMENTS

JP    2007-228531 A    9/2007
JP    4613465 B2    1/2011

(Continued)

OTHER PUBLICATIONS

Cheng et al, A Practical Panoram Parking Assistant System Based on Image Splicing, 2012.*

(Continued)

*Primary Examiner* — Shan Elahi
(74) *Attorney, Agent, or Firm* — Mintz Levin Cohn Ferris Glovsky and Popeo, P.C.; Peter F. Corless (57) ABSTRACT

An apparatus for correcting image distortion of a camera in a vehicle includes: a camera mounted in the vehicle; a camera characteristic extractor configured to extract camera characteristic parameters of the camera based on a preset mathematical model; a tilt angle calculator configured to calculate tilt angles of a virtual camera corresponding to the camera in each photographing region using the camera characteristic parameters; a yaw angle calculator configured to calculate yaw angles of the virtual camera in each photographing region; an image corrector configured to view-transform a photographed image photographed by the camera by adjusting angles of the virtual camera based on a correction model in order to secure a view region of the photographed image and create a corrected image depending on the view-transform; and a display configured to display the corrected image output from the image corrector.

16 Claims, 7 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2005/0200751 A1* | 9/2005 | Weaver | F16M 11/123 348/375 |
| 2005/0237385 A1* | 10/2005 | Kosaka | G01B 11/00 348/42 |
| 2006/0030987 A1* | 2/2006 | Akita | B62D 15/025 701/41 |
| 2006/0291698 A1* | 12/2006 | Oizumi | G06T 5/006 382/104 |
| 2007/0058879 A1* | 3/2007 | Cutler | G06T 5/006 382/254 |
| 2007/0200937 A1 | 8/2007 | Yoda | |
| 2007/0292010 A1* | 12/2007 | Allon | G06T 7/33 382/128 |
| 2008/0129756 A1* | 6/2008 | Iwano | B60R 1/00 345/632 |
| 2008/0136912 A1* | 6/2008 | Iwano | G06T 1/0007 348/148 |
| 2008/0219538 A1* | 9/2008 | Gering | G06T 15/04 382/132 |
| 2009/0122140 A1* | 5/2009 | Imamura | B60Q 9/005 348/148 |
| 2009/0189783 A1* | 7/2009 | Koitabashi | G01S 11/12 340/937 |
| 2010/0045700 A1* | 2/2010 | Lefevre | G02B 23/00 345/633 |
| 2010/0157058 A1* | 6/2010 | Feiden | G06K 9/00805 348/148 |
| 2010/0208032 A1 | 8/2010 | Kweon | |
| 2010/0231717 A1* | 9/2010 | Sasaki | G06T 5/006 348/148 |
| 2010/0322534 A1* | 12/2010 | Bolme | G06K 9/746 382/278 |
| 2011/0181689 A1 | 7/2011 | Kweon | |
| 2011/0285848 A1* | 11/2011 | Han | B60R 1/00 348/148 |
| 2011/0310219 A1* | 12/2011 | Kim | G08B 13/19643 348/36 |
| 2012/0038776 A1* | 2/2012 | Ahiska | G08B 13/19608 348/159 |
| 2012/0062745 A1* | 3/2012 | Han | B62D 15/029 348/148 |
| 2012/0194355 A1* | 8/2012 | Thomas | B60R 1/00 340/932.2 |
| 2012/0314073 A1* | 12/2012 | Shimoda | G06T 7/0018 348/148 |
| 2014/0010474 A1 | 1/2014 | Lee et al. | |
| 2014/0114534 A1* | 4/2014 | Zhang | B60R 1/00 701/42 |
| 2014/0247352 A1* | 9/2014 | Rathi | B60R 1/00 348/148 |
| 2014/0347469 A1* | 11/2014 | Zhang | B60R 1/00 348/118 |
| 2014/0347470 A1* | 11/2014 | Zhang | B60R 1/00 348/118 |
| 2014/0347485 A1* | 11/2014 | Zhang | B60R 11/04 348/148 |

FOREIGN PATENT DOCUMENTS

| | | |
|---|---|---|
| KR | 10-2006-0041116 A | 5/2006 |
| KR | 10-0898824 B1 | 5/2009 |
| KR | 10-1233948 B1 | 2/2013 |
| KR | 10-1249791 B1 | 4/2013 |
| KR | 10-2014-007212 A | 1/2014 |
| KR | 10-2014-0088779 A | 7/2014 |

OTHER PUBLICATIONS

Huang et al, Video Stabilization with Distortion Correction for Wide-angle Lens Dashcam, 2016.*

* cited by examiner

APPARATUS AND METHOD FOR CORRECTING IMAGE DISTORTION OF A CAMERA FOR VEHICLE

CROSS-REFERENCE TO RELATED APPLICATION

This application claims the benefit of and priority to Korean Patent Application No. 10-2014-0094138, filed on Jul. 24, 2014 in the Korean Intellectual Property Office, the disclosure of which is incorporated herein in its entirety by reference.

TECHNICAL FIELD

The present disclosure relates to an apparatus and a method for correcting image distortion of a camera for a vehicle, and more particularly, to an apparatus and a method for correcting image distortion of a camera for a vehicle and securing a wider view region by adjusting angles of a virtual camera based on a camera model.

BACKGROUND

In general, traffic accidents often cause significant social and economic damage. In view of this, research has been conducted into a "smart" vehicle in which advanced information communication technology is implemented in order to prevent traffic accidents and/or minimize damage due to the same.

An example thereof involves the use of a wide angle camera in order to increase a viewing angle of a driver. The wide angle camera provides an image for a region where it is difficult for the driver to directly view with the naked eye. However, when using the wide angle camera, distortion can occur in the photographed image due to a structure of the lens mounted in the camera. This distortion is intensified from a central portion of the image toward an outer portion thereof. Therefore, a wide angle camera can allow a driver to secure a wider viewing angle, but simultaneously decreases visibility of the driver due to the distortion of the image, thus making it difficult for the driver to accurately recognize a situation through the image.

In Korean Patent Laid-Open Publication No. 10-2014-0007212 that has been already filed by the present applicant, a tilt angle of the camera was adjusted using a cylindrical projection model, thereby correcting the distortion of the image. In this case, there is a vertical object distortion improving effect and information on left and right long distance dead zones may be provided. However, it is still impossible to secure an image for a bumper and a portion adjacent to the bumper due to short distance distortion.

In the related art, a method for adjusting the tilt angle of the camera using a pin hole projection model has been performed. In the pin hole projection model-based variable tilting method, distortion and radial distortion are corrected based on the ground, such that it is possible to secure an amount of a viewed bumper. However, it is impossible to secure an amount of viewed left and right long distances, and as a result, left and right dead zones are generated.

SUMMARY

The present disclosure has been made to solve the above-mentioned problems occurring in the related art while advantages achieved by the prior art are maintained intact.

An aspect of the present disclosure provides an apparatus and a method for correcting image distortion of a camera for a vehicle and securing a wider view region by adjusting a yaw angle and a tilt angle of a virtual camera based on a camera model.

According to embodiments of the present disclosure, an apparatus for correcting image distortion of a camera for a vehicle includes: a camera mounted in the vehicle; a camera characteristic extractor configured to extract camera characteristic parameters of the camera based on a preset mathematical model; a tilt angle calculator configured to calculate a tilt angle of a virtual camera corresponding to the camera in one or more photographing regions using the camera characteristic parameters; a yaw angle calculator configured to calculate a yaw angle of the virtual camera in each of the one or more photographing regions; a correction model creator configured to create a correction model by applying the calculated tilt angle and the calculated yaw angle of the virtual camera in each of the one or more photographing regions; an image corrector configured to view-transform a photographed image photographed by the camera by adjusting an angle of the virtual camera based on the created correction model in order to secure a view region of the photographed image and create a corrected image depending on the view-transform; and a display configured to display the corrected image output from the image corrector.

The tilt angle may be an angle at which the camera is tilted toward the ground with respect to a line that is parallel to the ground.

The yaw angle may be an angle at which the camera is rotated toward the left and the right with respect to a line that is perpendicular to a surface on which the camera is mounted.

The correction model may be implemented as any one of: a pin hole projection model, a spherical projection model, a cylindrical projection model, and a plane projection model.

The camera characteristic parameters may be divided into camera extrinsic parameters and camera intrinsic parameters.

The camera extrinsic parameters may include information relating to mounting characteristics of the camera including an installation height of the camera and a direction of the camera.

The camera intrinsic parameters may include information relating to optical characteristics of the camera including a focal length of the camera, a principal point of the camera, and a skew coefficient of the camera.

The image corrector may be further configured to adjust the tilt angle and the yaw angle of the virtual camera depending on the tilt angle and the yaw angle in each of the one or more photographing regions to view-transform the photographed image.

The camera may be a wide angle camera.

According to embodiments of the present disclosure, a method for correcting image distortion of a camera for a vehicle includes: extracting camera characteristic parameters of the camera which is mounted in the vehicle; calculating a tilt angle and a yaw angle of a virtual camera corresponding to the camera in one or more photographing regions using the camera characteristic parameters; creating a correction model by applying the calculated tilt angle and the calculated yaw angle in each of the one or more photographing regions; adjusting an angle of the virtual camera based on the created correction model in order to secure a view region of a photographed image photographed by the camera; view-transforming the photographed image depending on the adjustment of the angle of the virtual camera to create a corrected image; and displaying the corrected image.

Each of the one or more photographing regions may be a region in a pixel unit.

The tilt angle may be an angle at which the camera is tilted toward the ground with respect to a line that is parallel to the ground.

The yaw angle may be an angle at which the camera is rotated toward the left or the right with respect to a line that is perpendicular to a surface on which the camera is mounted.

In the adjusting of the angle of the virtual camera, the tilt angle and the yaw angle of the virtual camera may be adjusted depending on the tilt angle and the yaw angle in each of the one or more photographing regions.

The camera may be a wide angle camera.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for correcting image distortion of a camera in a vehicle.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present disclosure is intended to correct an image photographed by a camera by moving (e.g., changing) view points (e.g., tilt angle and yaw angle) of a virtual camera based on various camera models within the same frame in order to secure a wider view region by minimizing image information lost at the time of correcting image distortion. Notably, the term "wide angle camera" is used primarily throughout the present disclosure. However, the teachings of the present disclosure are applicable to any type camera suitable for use with a vehicle.

Figure 1:
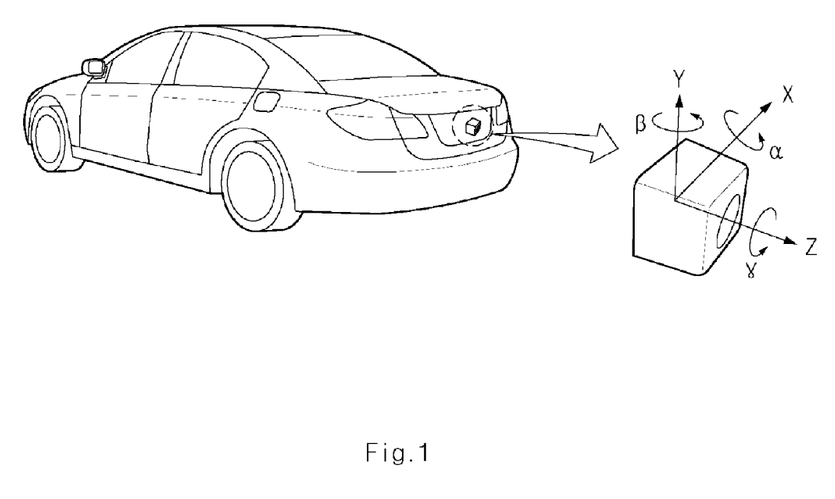
FIG. 1 is a view showing a camera coordinate system associated with the present disclosure.

Here, the movement of the view points of the virtual camera includes changing the tilt angle and the yaw angle of the virtual camera. The change of the tilt angle indicates changing a value $\alpha$ of a pitch rotating around an x-axis in a coordinate system defined as shown in FIG. 1 based on a camera mounted in a vehicle to change an extrinsic parameter of the virtual camera. In addition, the change of the yaw angle indicates changing a value $\beta$ of a yaw rotating around a y-axis.

Figure 2:
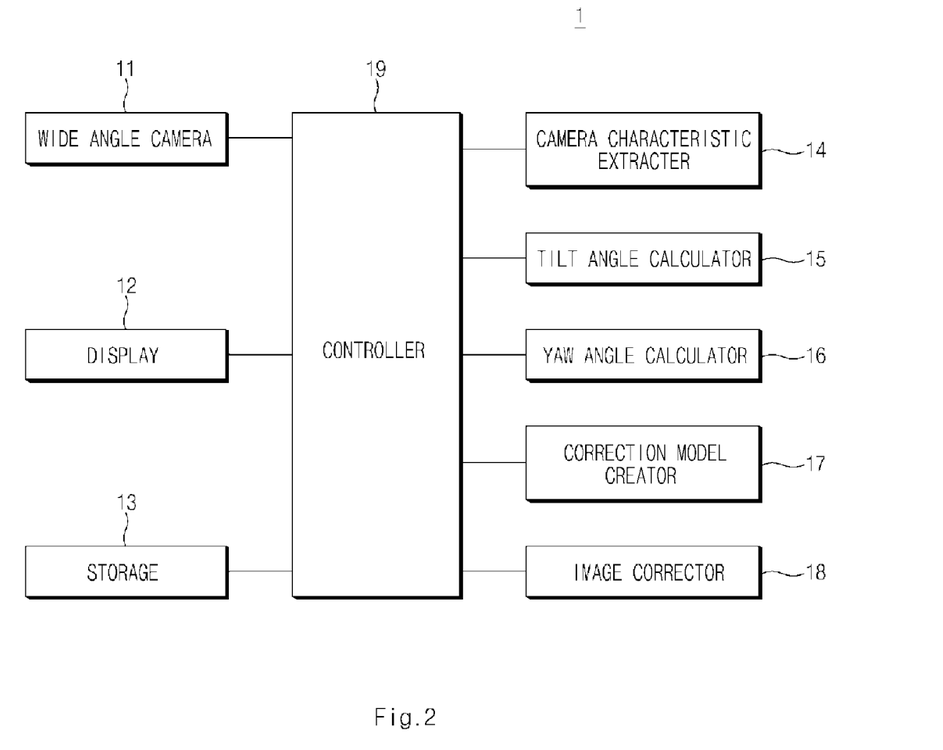
FIG. 2 is a block diagram showing components of an apparatus for correcting image distortion of a camera for a vehicle according to embodiments of the present disclosure.
Figure 3:
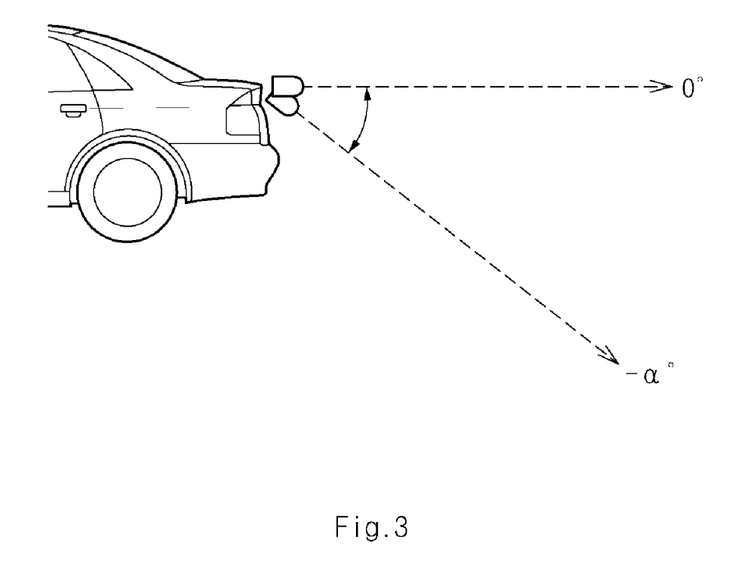
FIG. 3 is an illustrative view showing adjustment of a tilt angle of a virtual camera according to the present disclosure.
Figure 4:
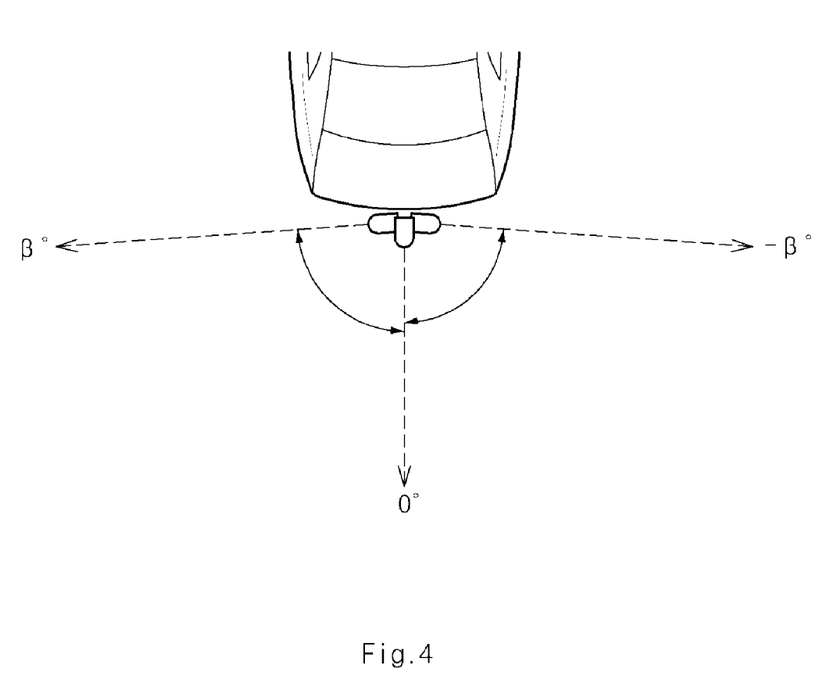
FIG. 4 is an illustrative view showing adjustment of a yaw angle of a virtual camera according to the present disclosure.

FIG. 2 is a block diagram showing components of an apparatus for correcting image distortion of a wide angle camera for a vehicle according to embodiments of the present disclosure; FIG. 3 is an illustrative view showing adjustment of a tilt angle of a virtual camera according to the present disclosure; and FIG. 4 is an illustrative view showing adjustment of a yaw angle of a virtual camera according to the present disclosure.

As shown in FIG. 2, an apparatus 1 for correcting image distortion of a wide angle camera for a vehicle according to embodiments of the present disclosure is configured to include a camera 11 (e.g., a wide angle camera), a display 12, a storage 13, a camera characteristic extractor 14, a tilt angle calculator 15, a yaw angle calculator 16, a correction model creator 17, an image corrector 18, and a controller 19.

The camera 11, which may preferably be a wide angle camera, is disposed on a rear surface and/or a side surface of the vehicle to photograph a rear image and/or a side image of the vehicle. Here, the camera 11 provides a viewing angle of 90 degrees or more through a fisheye lens, a super-wide angle lens, a wide angle lens, and the like.

The display 12 displays an operation state and result of the apparatus 1 for correcting image distortion of a camera for a vehicle and displays a photographed image photographed by the wide angle camera 11. The display 12 may be installed in the vehicle and be implemented by a liquid crystal display, a transparent display, a light emitting diode (LED) display, a flexible display, a head-up display, or the like.

The storage 13 stores characteristic information of the camera 11, a correction coefficient for correcting image distortion, set information, and the like, therein. In addition, the storage 13 stores the image photographed by the wide angle camera 11 therein.

The camera characteristic extractor 14 extracts camera characteristic parameters of the camera 11 mounted in the vehicle based on a preset mathematical model. Here, the camera characteristic extractor 14 extracts mounting characteristics and optical characteristics of the camera as the camera characteristic parameters. The mounting characteristics are camera extrinsic parameters such as an installation height, direction (e.g., yaw and tilt), and the like, of the camera, and the optical characteristics are camera intrinsic parameters such as a focal length, a lens viewing angle, an aspect ratio, a principal point, a skew coefficient, and the like, of the camera.

The camera characteristic parameters extracted by the camera characteristic extractor 14 are used to create a virtual camera corresponding to the camera 11 and are used to set a tilt angle and a yaw angle of the virtual camera.

The tilt angle calculator 15 calculates tilt angles of the virtual camera in each photographing region by applying the camera characteristic parameters extracted by the camera characteristic extractor 14. Here, the tilt angle is an angle ($-\alpha$) at which the camera 11 is tilted toward or away from the ground with respect to a reference line that is parallel to the ground. It is assumed that the reference line is at zero degrees, as shown in FIG. 3. In addition, the photographing region means a region in a pixel unit.

The yaw angle calculator 16 calculates yaw angles of the virtual camera in each photographing region by applying the camera characteristic parameters extracted by the camera characteristic extractor 14. Here, the yaw angle is an angle at which the camera 11 is rotated toward the left (−) or the right (+) with respect to a line that is perpendicular to a surface on which the camera 11 is installed as shown in FIG. 4.

The correction model creator 17 creates a correction model for correcting the photographed image photographed by the camera 11 using the tilt angles and the yaw angles each calculated by the tilt angle calculator 15 and the yaw angle calculator 16. Here, the correction model, which is a projection model, may be implemented as any one of a pin hole projection model, a spherical projection model, a cylindrical projection model, and a plane projection model.

The image corrector 18 creates a corrected image through view-transform of the photographed image in which the correction model created by the correction model creator 17 is applied to the photographed image photographed by the wide angle camera 11. The image corrector 18 creates the virtual camera corresponding to the camera 11 using the camera characteristic parameters output from the camera characteristic extractor 14. In addition, the image corrector 18 applies the correction model created by the correction model creator 17 to the virtual camera. In other words, the image corrector 18 adjusts the tilt angle and the yaw angle of the virtual camera depending on the tilt angles and the yaw angles calculated in each photographing region to minimize image information lost at the time of view-transforming, thereby view-transforming the photographed image while securing a wider view region.

The image corrector 18 outputs the corrected image to the display 12. Therefore, a driver confirms the corrected image displayed on a screen of the display 12, thereby making it possible to accurately recognize a state of the rear of the vehicle.

The controller 19 controls operations of the respective components to correct distortion of the photographed image photographed by the camera 11 and allow the image of which the distortion is corrected to be output.

Figure 5:
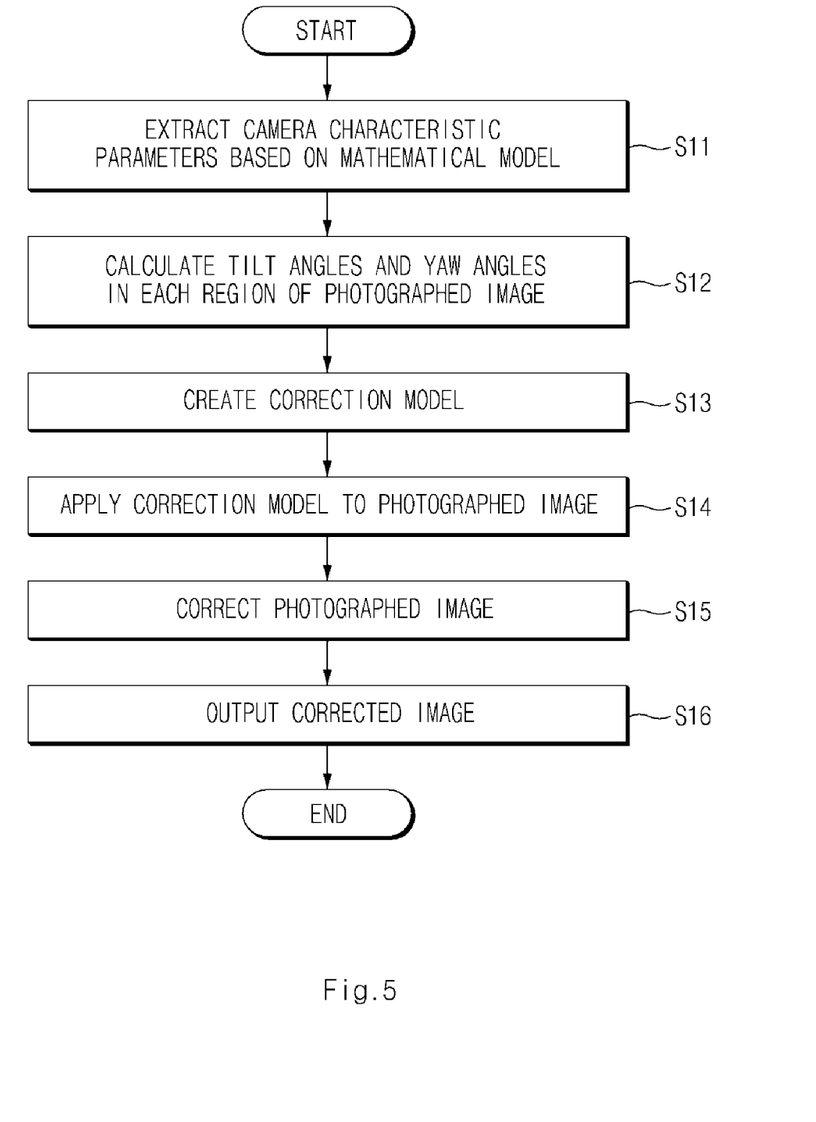
FIG. 5 is a flow chart showing a method for correcting image distortion of a camera for a vehicle according to embodiments of the present disclosure.

FIG. 5 is a flow chart showing a method for correcting image distortion of a camera for a vehicle according to embodiments of the present disclosure.

Referring to FIG. 5, the apparatus 1 for correcting image distortion of a camera for a vehicle according to embodiments of the present disclosure extracts the camera characteristic parameters of the wide angle camera 11 (S11). That is, the controller 19 of the apparatus 1 for correcting image distortion of a camera for a vehicle extracts the camera characteristic parameters of the camera 11 using a known camera calibration technology. Here, the camera calibration refers to an operation of finding parameters determining a relationship between a three-dimensional world coordinate and a two-dimensional image coordinate displayed on a screen using three-dimensional information present in a world and two-dimensional image information and characteristics of a camera model in which lens distortion is reflected.

In addition, the camera characteristic parameters are divided into camera extrinsic parameters associated with camera mounting and camera intrinsic parameters associated with optics of the camera. Here, the camera extrinsic parameters include an installation height, direction (e.g., yaw and tilt), and the like, of the camera, and the camera intrinsic parameters include a focal length, a principal point, a skew coefficient, and the like, of the camera. The camera intrinsic parameters may be found using a calibration tool such as the GML Camera Calibration Toolbox.

The apparatus 1 for correcting image distortion of a camera for a vehicle creates the virtual camera corresponding to the camera 11 by applying the extracted camera characteristic parameters and calculates the tilt angles and the yaw angles of the virtual camera in each photographing region of the photographed image of the wide angle camera 11 (S12). Here, the photographing region means a region in a pixel unit.

The apparatus 1 for correcting image distortion of a camera for a vehicle creates the correction model for correcting the photographed image by applying the tilt angles and the yaw angles calculated in each photographing region (S13). Here, the correction model is a projection model for finding a parameter of a deformed ellipsoid allowing a straight line on a space in an image projected onto a plane to be viewed as the straightest line. Here, as the projection model, any one of a pin hole projection model, a spherical projection model, a cylindrical projection model, and a plane projection model may be used.

The apparatus 1 for correcting image distortion of a camera for a vehicle applies the image photographed by the camera 11 to the correction model to correct the distortion of the photographed image (S14 and S15). Here, the apparatus 1 for correcting image distortion of a wide angle camera for a vehicle adjusts the tilt angle and the yaw angle of the virtual camera depending on the tilt angles and the yaw angles in each photographing region calculated by applying a distortion correction model to the virtual camera to view-transform the photographed image, thereby correcting the photographed image.

In addition, the apparatus 1 for correcting image distortion of a camera for a vehicle may additionally create a compensation model for compensating for heterogeneity occurring in the case in which the distortion of the photographed image is corrected and apply the corrected image to the compensation model to create a final output image. Then, the apparatus 1 for correcting image distortion of a camera for a vehicle outputs the corrected image to the display 12 provided in the vehicle (S16).

Figure 6:
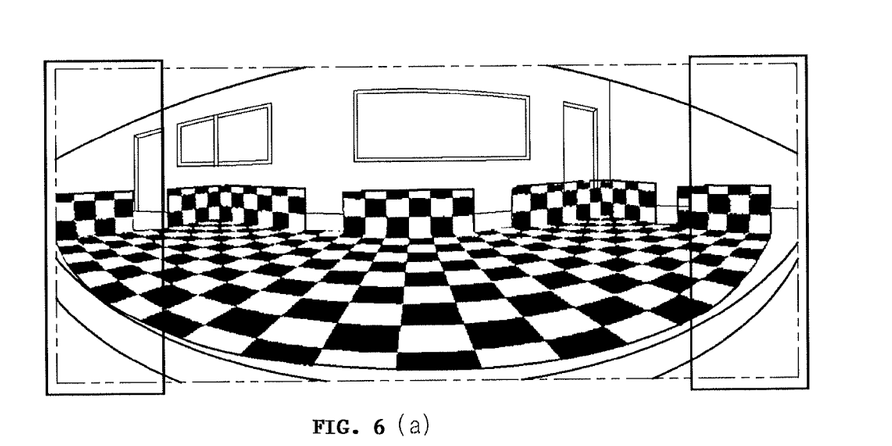
FIGS. 6A and 6B are illustrative views showing an image in which distortion of a photographed image is corrected according to the present disclosure.
Figure 7A:
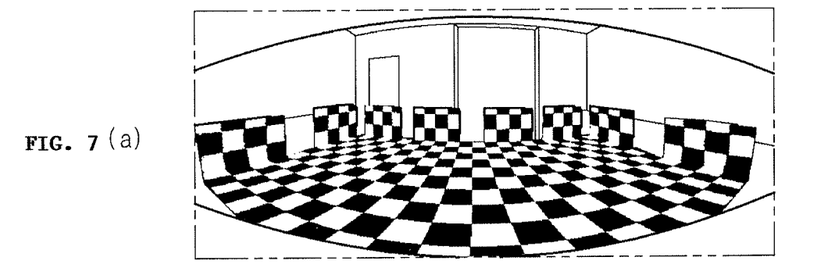
FIGS. 7A to 7D are illustrative views showing a view mode depending on a projection model according to the present disclosure.
Figure 7B:
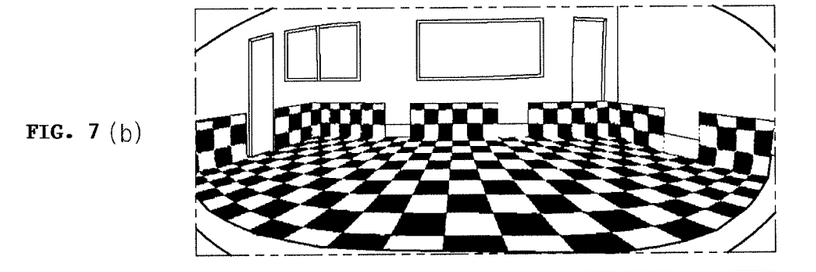
Figure 7C:
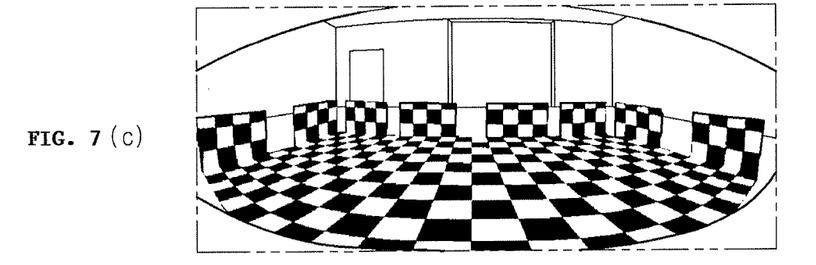
Figure 7D:
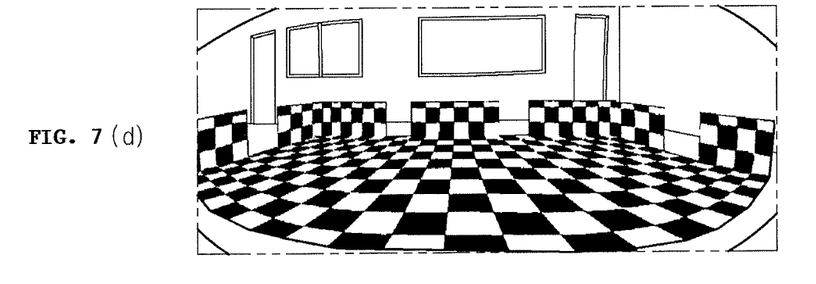

FIGS. 6A and 6B are illustrative views showing an image in which distortion of a photographed image is corrected according to the present disclosure; and FIGS. 7A to 7D are illustrative views showing a view mode depending on a projection model according to the present disclosure.

FIG. 6A shows a corrected image in which the distortion of the photographed image of the wide angle camera 11 is corrected by adjusting only the tilt angle of the virtual camera according to the related art. In contrast, FIG. 6B shows a corrected image in which the apparatus 1 for correcting image distortion of a camera for a vehicle according to embodiments of the present disclosure corrects the distortion of the photographed image by adjusting the tilt angle and the yaw angle of the virtual camera in each pixel of the photographed image photographed by the camera 11 based on a correction model in which characteristics of the camera are considered. An amount of a viewed image and a perspective sense of the image may be adjusted in the corrected image according to the method for correcting image distortion of a camera for a vehicle according to embodiments of the present disclosure as compared with the corrected image according to the method for correcting image distortion in to the related art. In addition, according to the present disclosure, image compression ratios for all regions of the image are changed, thereby making it possible to design various view modes as shown in FIG. 7.

The present disclosure may solve a limitation by securing an amount of viewed short distance image information by moving the view points of the virtual camera based on various camera models within the same image frame. According to the present disclosure, the yaw angle and the tilt angle of the virtual camera are adjusted based on the camera model to correct the distortion of the image photographed by the wide angle camera, such that a dead zone of the camera is minimized and an amount of a viewed pump is secured, thereby making it possible to improve a driver's visual field and minimize vertical object distortion of the wide angle camera.

In addition, according to the present disclosure, the image compression ratios for all regions of the output image are changed, thereby making it possible to design various view modes. Further, according to the present disclosure, it is possible to secure a wider view region while maintaining characteristics of the distortion correction using the virtual camera model.

Although the apparatus, method, and computer readable medium for correcting image distortion of a camera for a vehicle according to embodiments of the present disclosure have been described above with reference to the accompanying drawings, the present disclosure is not limited thereto, but may be applied without departing from the spirit and scope of the present disclosure.

What is claimed is:

1. An apparatus for correcting image distortion of a camera in a vehicle, comprising:
   a camera mounted in the vehicle;
   a controller configured to:
   extract camera characteristic parameters of the camera based on a correction coefficient for correcting image distortion;
   calculate a tilt angle of a virtual camera corresponding to the camera in one or more photographing regions using the camera characteristic parameters;
   calculate a yaw angle of the virtual camera in each of the one or more photographing regions;
   create a correction model by applying the calculated tilt angle and calculated the yaw angle of the virtual camera in each of the one or more photographing regions;
   view-transform a photographed image photographed by the camera by adjusting the tilt angle and the yaw angle of the virtual camera based on the created correction model to secure a view region of the photographed image and create a corrected image depending on the view transformation; and
   display the corrected image on a display disposed within the vehicle.

2. The apparatus for correcting image distortion of a camera in a vehicle according to claim 1, wherein the tilt angle is an angle at which the camera is tilted toward the ground with respect to a line that is parallel to the ground.

3. The apparatus for correcting image distortion of a camera in a vehicle according to claim 1, wherein the yaw angle is an angle at which the camera is rotated toward the left or the right with respect to a line that is perpendicular to a surface on which the camera is mounted.

4. The apparatus for correcting image distortion of a camera in a vehicle according to claim 1, wherein the correction model is implemented as any one of: a pin hole projection model, a spherical projection model, a cylindrical projection model, and a plane projection model.

5. The apparatus for correcting image distortion of a camera in a vehicle according to claim 1, wherein the camera characteristic parameters are divided into camera extrinsic parameters and camera intrinsic parameters.

6. The apparatus for correcting image distortion of a camera in a vehicle according to claim 5, wherein the camera extrinsic parameters include information relating to mounting characteristics of the camera including an installation height of the camera and a direction of the camera.

7. The apparatus for correcting image distortion of a camera in a vehicle according to claim 5, wherein the camera intrinsic parameters include information relating to optical characteristics of the camera including a focal length of the camera, a principal point of the camera, and a skew coefficient of the camera.

8. The apparatus for correcting image distortion of a camera in a vehicle according to claim 1, wherein the image corrector is further configured to adjust the tilt angle and the yaw angle of the virtual camera depending on the tilt angle and the yaw angle in each of the one or more photographing regions to view-transform the photographed image.

9. The apparatus for correcting image distortion of a camera in a vehicle according to claim 1, wherein the camera is a wide angle camera.

10. A method for correcting image distortion of a camera in a vehicle, comprising:

extracting, by a controller, camera characteristic parameters of the camera which is mounted in the vehicle based on a correction coefficient for correcting image distortion;

calculating, by the controller, a tilt angle and a yaw angle of a virtual camera corresponding to the camera in one or more photographing regions using the camera characteristic parameters;

creating, by the controller, a correction model by applying the calculated tilt angle and the calculated yaw angle in each of the one or more photographing regions;

adjusting, by the controller, an angle of the virtual camera based on the created correction model in order to secure a view region of a photographed image photographed by the camera;

view-transforming, by the controller, the photographed image by adjusting the tilt angle and the yaw angle of the virtual camera based on the created correction model to secure a view region of the photographed image and create a corrected image depending on the view-transformation; and displaying, by the controller, the corrected image on a display disposed within the vehicle.

11. The method for correcting image distortion of a camera in a vehicle according to claim 10, wherein each of the one or more photographing regions is a region in a pixel unit.

12. The method for correcting image distortion of a camera in a vehicle according to claim 10, wherein the tilt angle is an angle at which the camera is tilted toward the ground with respect to a line that is parallel to the ground.

13. The method for correcting image distortion of a camera in a vehicle according to claim 10, wherein the yaw angle is an angle at which the camera is rotated toward the left or the right with respect to a line that is perpendicular to a surface on which the camera is mounted.

14. The method for correcting image distortion of a camera in a vehicle according to claim 10, wherein in the adjusting of the angle of the virtual camera, the tilt angle and the yaw angle of the virtual camera are adjusted depending on the tilt angle and the yaw angle in each of the one or more photographing regions.

15. The method for correcting image distortion of a camera in a vehicle according to claim 10, wherein the camera is a wide angle camera.

16. A non-transitory computer readable medium containing program instructions executed by a controller for correcting image distortion of a camera in a vehicle, the computer readable medium comprising:

program instructions that extract camera characteristic parameters of the camera which is mounted in the vehicle based on a correction coefficient for correcting image distortion;

program instructions that calculate a tilt angle and a yaw angle of a virtual camera corresponding to the camera in one or more photographing regions using the camera characteristic parameters;

program instructions that create a correction model by applying the calculated tilt angle and the calculated yaw angle in each of the one or more photographing regions;

program instructions that adjust an angle of the virtual camera based on the created correction model in order to secure a view region of a photographed image photographed by the camera;

program instructions that view-transform the photographed image by adjusting the tilt angle and the yaw angle of the virtual camera based on the created correction model to secure a view region of the photographed image and create a corrected image depending on the view-transformation; and program instructions that display the corrected image on a display disposed within the vehicle.

* * * * *